UNITED STATES PATENT OFFICE.

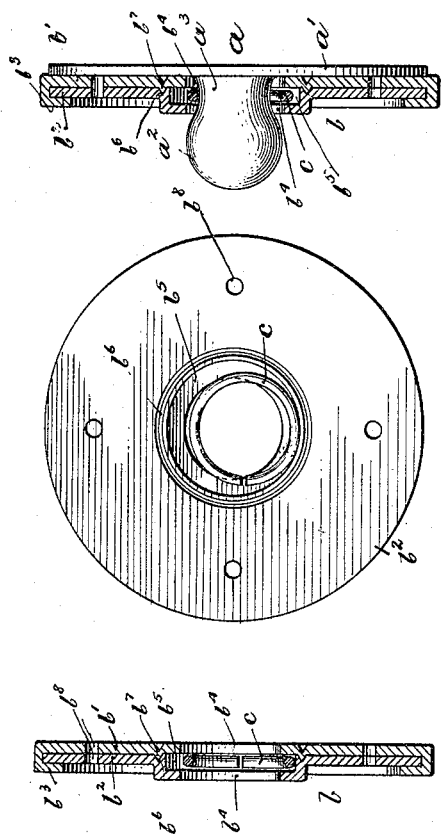

MAX MENKIN AND SIGISMUND FISCHER, OF NEW YORK, N. Y.

PRESS-BUTTON.

1,209,470.  Specification of Letters Patent.  Patented Dec. 19, 1916.

Application filed December 4, 1915. Serial No. 65,005.

*To all whom it may concern:*

Be it known that we, MAX MENKIN, a subject of the Russian Emperor, and SIGISMUND FISCHER, a citizen of the United States of America, the former residing at New York, in the county of Bronx and the State of New York, and the latter residing at New York, in the county of New York and State of New York, have invented certain new and useful Improvements in Press-Buttons, of which the following is a specification.

Our invention relates to a separable fastener or press button for garments, and has for its object to produce a fastener or button of a simpler construction than that now in use, reducing its cost of manufacture and simplifying the machinery and labor necessary for its production.

With this object in view, our invention consists in the novel construction, arrangement and combination of parts, as will be hereinafter described by reference to the accompanying drawing and as set forth in the appended claims.

In the drawing, wherein similar reference characters denote corresponding parts, Figure 1 is a sectional view of the female member of our fastener; Fig. 2 is an inner face view of a part of said female member and Fig. 3 is a similar view as Fig. 1, showing the male and female members in engagement with one another.

The new fastener consists of two members $a$, $b$, of which $a$ is the male member, which as in the usual construction, consists of a plate $a'$ and a stud having a spherically shaped head $a^2$ and a cylindrical stem $a^3$ of reduced diameter.

$b$ is the female member, the structure of which we are particularly concerned with, our object being to produce a female member, which, while of simple and inexpensive construction, will be capable of effectively or securely holding the male member in engagement with it. To this end the female member is composed of two parts in form of plates or disks $b'$, $b^2$ placed flatly on top of one another and joined together to constitute a solid single member.

The fastening of the two pieces may be effected by clenching the edges thereof, as at $b^3$, (Figs. 1 and 3). The two plates or disks are each provided with a circular central hole $b^4$ of equal diameter and large enough to allow the passage of the head $a^2$ of the stud of the male member $a'$. The plate $b^2$ has on its inner face a depression or cavity $b^5$ which encircles the opening $b^4$ thereof and which is covered by the plate $b'$ thus forming a socket in which is lodged a spring $c$ made of a split wire ring. This wire ring is so admeasured that in contracted or normal state its inner diameter is somewhat smaller than the diameter of the head $a^2$ of the stud and consequently smaller than that of the holes $b^4$, so that the ring will obstruct or partly close the opening $b^4$ of the female member. The cavity $b^5$ in the part $b^2$ of the female member is somewhat wider than the outer diameter of the ring $c$ so that the ring will have enough room to expand therein so far as to permit the passage of the head $a^2$ of the male member, when the members are engaged with one another.

The stud of the male member is adapted when engaged with the female member to project with its spherical head $a^2$ outwardly while the reduced cylindrical stem $a^3$ will be located within the cavity, permitting the ring to contract around said stem and thereby lock the members together.

The plates $b'$, $b^2$ of the female member are liable in course of time to become separated near their inner edges owing to the pull or push action of the male member and in that case the split ring is liable to slip into the formed slit as a result of which the button would be rendered inoperative. To obviate this drawback, one of the plates, as $b'$, near its central opening is provided with an annular projection, such as a wedge-shaped rib $b^7$ or the like and the other plate $b^2$ with a correspondingly shaped depression or groove $b^6$ adapted to snugly engage said rib. If the plates separate far enough to allow the ring to slip between the plates, the rib will form an obstruction in the slit and prevent the ring from entering the same. The holes $b^8$ serve for fastening the female member to a garment.

Since the construction can be easily modified without departing from the principle of our invention, we do not restrict ourselves to the details described and shown.

What we claim and desire to secure by Letters Patent is:

1. In a press button or separable fastener, a female member, consisting of two centrally perforated plates clenched together and formed with a socket, and a split ring loosely borne in said socket, one of said plates being provided with a projecting part adjacent to its central perforation and the other plate with a depression adapted to engage said part, said projecting part serving to form an obstruction between the plates when separated near their inner edges and to prevent the said split ring from entering the formed slit.

2. In a press button or separable fastener, a female member, consisting of two centrally perforated plates clenched together and formed with a socket, and a split ring loosely borne in said socket, one of said plates being formed with an annular projection and the other plate with an annular depression adapted to snugly engage said projection, said projection serving to form an obstruction between the said plates when separated near their inner edges and to prevent the split ring from entering the formed slit.

In testimony whereof we affix our signatures in presence of two witnesses.

MAX MENKIN.
SIGISMUND FISCHER.

Witnesses:
J. C. MENKIN,
ALEXANDER HELFANT.

Copies of this patent may be obtained for five cents each, by addressing the "Commissioner of Patents. Washington, D C."